United States Patent
Maciolek et al.

(10) Patent No.: US 12,361,472 B1
(45) Date of Patent: Jul. 15, 2025

(54) AUTONOMOUS DATA CONTAINERS WITH ARTIFICIAL INTELLIGENCE

(71) Applicant: UIPCO, LLC, San Antonio, TX (US)

(72) Inventors: Michael J. Maciolek, Kerrville, TX (US); Timothy Frank Davison, San Antonio, TX (US); Donnette L. Moncrief Brown, San Antonio, TX (US); Bryan J. Osterkamp, New Braunfels, TX (US); Kori Rochelle Newman, San Antonio, TX (US); Brian Francisco Shipley, Plano, TX (US); Eric David Schroeder, San Antonio, TX (US); Robert Wiseman Simpson, Fair Oaks Ranch, TX (US); Manfred Amann, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/657,983

(22) Filed: May 8, 2024

Related U.S. Application Data (62) Division of application No. 17/102,842, filed on Nov. 24, 2020, now abandoned.

(Continued)

(51) Int. Cl.
*G06F 16/00* (2019.01)
*G06Q 30/0601* (2023.01)
*G06Q 20/40* (2012.01)

(52) U.S. Cl.
CPC ......... *G06Q 30/0637* (2013.01); *G06F 16/00* (2019.01); *G06Q 20/4016* (2013.01)

(58) Field of Classification Search
CPC . G06Q 30/0637; G06Q 20/4016; G06F 16/00
See application file for complete search history.

(56) References Cited

U.S. PATENT DOCUMENTS 8,910,156 B1 * 12/2014 Kenchammana-Hosekote ............ G06F 9/45558 718/1
10,037,424 B1 * 7/2018 Guenther .................. G06F 9/50
(Continued)

FOREIGN PATENT DOCUMENTS

EP 3624042 A1 * 3/2020 ........... G06Q 20/401

OTHER PUBLICATIONS

Final Office Action mailed Feb. 16, 2024 for U.S. Appl. No. 17/102,842.

*Primary Examiner* — Sherief Badawi
*Assistant Examiner* — Earl Elias
(74) *Attorney, Agent, or Firm* — Plumsea Law Group, LLC (57) ABSTRACT

An autonomous data container and methods of use are disclosed. The autonomous data container includes a data storage structure for storing financial transaction information. The autonomous data container also includes an artificially intelligent agent stored as code within the container. The artificially intelligent agent can run on a system storing the autonomous data container. The artificially intelligent agent can access transaction information in the data storage structure and make predictions and/or decisions on a consumer's behalf. The artificially intelligent agent can make new purchases on the consumer's behalf. The artificially intelligent agent can also provide fraud alerts for the consumer.

7 Claims, 10 Drawing Sheets

Related U.S. Application Data

(60) Provisional application No. 62/940,944, filed on Nov. 27, 2019.

(56) References Cited

U.S. PATENT DOCUMENTS

| | | | |
|---|---|---|---|
| 11,256,791 B2 | 2/2022 | Douglas | |
| 11,494,721 B1 | 11/2022 | Lah | |
| 2004/0030741 A1* | 2/2004 | Wolton | G06F 16/954 |
| | | | 709/202 |
| 2005/0108157 A1* | 5/2005 | Bushman | G07F 7/08 |
| | | | 705/40 |
| 2008/0059454 A1* | 3/2008 | Andrieu | G06F 16/951 |
| | | | 707/999.005 |
| 2009/0328034 A1* | 12/2009 | Corcoran | G06F 9/5072 |
| | | | 718/1 |
| 2011/0155799 A1* | 6/2011 | Meszaros | G07F 17/42 |
| | | | 235/379 |
| 2013/0031000 A1* | 1/2013 | Morris | G06F 9/45533 |
| | | | 726/3 |
| 2014/0095868 A1* | 4/2014 | Korthny | G06F 21/64 |
| | | | 713/165 |
| 2014/0136294 A1* | 5/2014 | Martinovic | G06Q 40/03 |
| | | | 705/7.37 |
| 2016/0132886 A1* | 5/2016 | Burke | G06Q 20/3827 |
| | | | 705/44 |
| 2017/0147656 A1 | 5/2017 | Choudhary | |
| 2018/0198842 A1* | 7/2018 | Chandran | G06F 12/109 |
| 2020/0007474 A1* | 1/2020 | Zhang | G09B 7/02 |
| 2020/0294033 A1* | 9/2020 | Wilson | G06Q 20/0658 |
| 2022/0050751 A1 | 2/2022 | Hazra | |

* cited by examiner

AUTONOMOUS DATA CONTAINERS WITH ARTIFICIAL INTELLIGENCE

CROSS-REFERENCE TO RELATED APPLICATIONS

This application is a Divisional of co-pending U.S. patent application Ser. No. 17/102,842, filed Nov. 24, 2020, and titled "Autonomous Data Containers with Artificial Intelligence", which application claims the benefit of Provisional Patent Application No. 62/940,944 filed Nov. 27, 2019, and titled "Autonomous Data Containers with Artificial Intelligence." These applications are incorporated by reference herein in their entirety.

TECHNICAL FIELD

The present disclosure generally relates to data, and specifically to data containers.

BACKGROUND

Financial transaction data is captured every time a consumer makes a purchase. The financial transaction data is often stored in one or more locations. The data may be stored in databases owned by various financial parties that facilitate processing the transaction, including the consumer's banking or credit institution. The data is stored in static data structures or containers that may be queried by various services. Often, consumers do not have access to their own financial transaction data and therefore have limited control over how the data is used. Moreover, the proliferation of this data means that providers in control of the data may not be able to put all the data to good use.

There is a need in the art for a system and method that addresses the shortcomings discussed above.

SUMMARY

In one aspect, an autonomous data container associated with a financial transaction made by a consumer includes a data storage structure including transaction information about the financial transaction and an artificially intelligent agent. The artificially intelligent agent can read the transaction information and the artificially intelligent agent is authorized to make a new purchase on behalf of the consumer based on the transaction information.

In another aspect, an autonomous data container associated with a financial transaction made by a consumer includes a data storage structure including transaction information about the financial transaction and an artificially intelligent agent. The artificially intelligent agent can read the transaction information and the artificially intelligent agent can identify an indicator of fraud in the transaction information.

In another aspect, a method of creating an autonomous data container includes steps of receiving financial transaction information and generating a new autonomous data container. The autonomous data container includes a data storage structure and an artificially intelligent agent that can access the data storage structure. The method further includes populating one or more fields in the data storage structure using the received financial transaction information.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a system and method for storing and utilizing data associated with financial transactions. The system comprises one or more autonomous data containers that include a data storage structure and a built-in artificially intelligent agent that can read and react to information stored in the data storage structure. The artificially intelligent agent can analyze financial transaction information and predict a future purchase for a consumer. The agent may also communicate directly with a merchant to make the purchase. The agent can also analyze financial transaction information to look for indicators of fraud. In some cases, multiple autonomous data containers can communicate with one another so that one artificially intelligent agent can analyze information from multiple data containers, which correspond to multiple different financial transactions, in order to make purchasing decisions and/or detect fraud.

By embedding an artificially intelligent agent into a data container, the data container can behave autonomously and automatically anticipate items or services a consumer may want to purchase in the future. Using this system also allows fraud detection to be performed at any time, rather than waiting for data to be stored at a central repository, organized, and batched for analysis.

Figure 1:
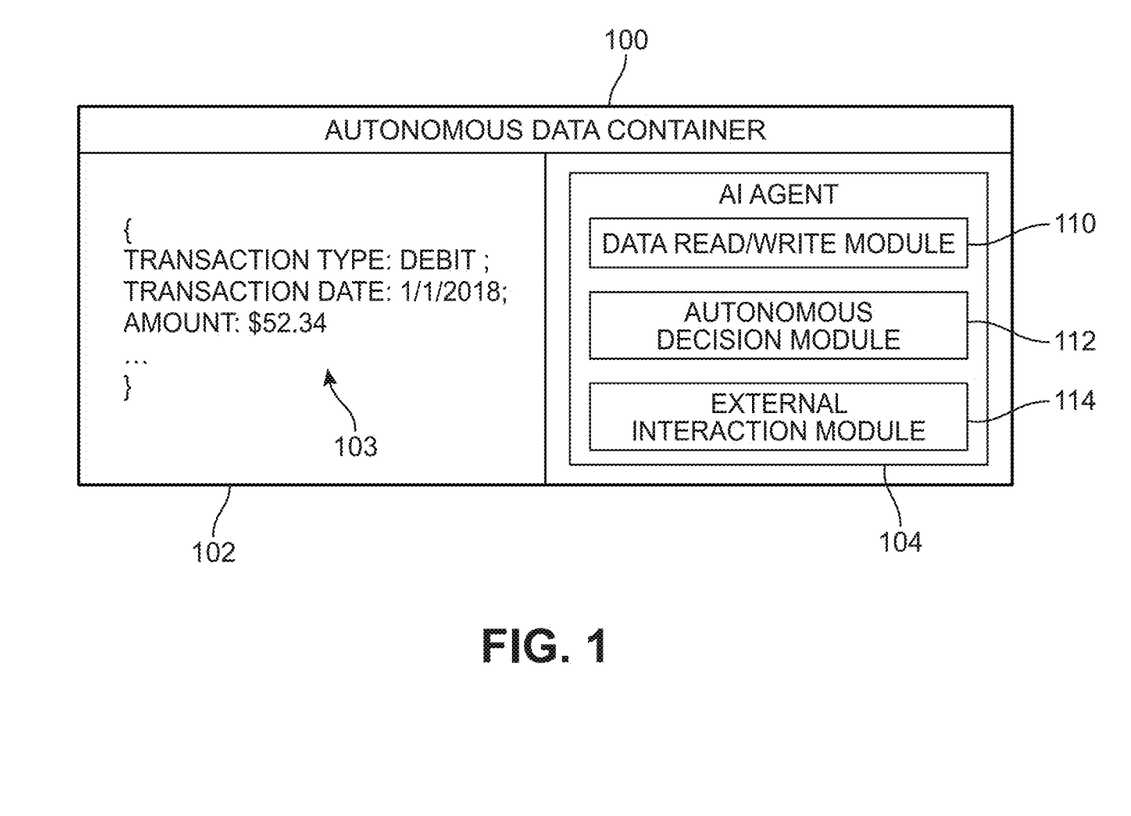
FIG. 1 is a schematic view of an autonomous data container, according to an embodiment.

FIG. 1 is a schematic view of an embodiment of an autonomous data container 100. Autonomous data container 100, also referred to simply as container 100, includes both a data storage structure 102 and an artificially intelligent agent 104.

Data storage structure 102 comprises a data structure that retains data. Data storage structure 102 could comprise any type of data structure known in the art. These include, but are not limited to: arrays, linked lists, records, unions, tagged unions, objects, graphs, and binary trees.

Generally, data storage structure 102 may store any suitable kinds of data. In some embodiments, data storage structure 102 may store financial transaction data. As used herein, the term "financial transaction data" (also referred to as "financial transaction information") refers to any data related to one or more financial transactions. Financial transaction data may include data related to a variety of different transaction types. Transaction types could include, but are not limited to: new financial payments, recurring financial payments, bank transfers, wire transfers, checking transactions, as well as other known kinds of financial transactions.

The data stored within a data storage structure 102 may generally depend on the type of transaction. In the exemplary embodiment, data fields 103 comprise at least a transaction type, a transaction date, and an amount. Embodiments can include any number of suitable data fields associated with a financial transaction. Some other possible data fields include a "To Account" data field that allows systems to record the destination account for a given transaction; a "To Account Routing Number" data field that allows systems to record a particular routing number for the destination account; and a "To Account Type" data field that allows systems to record an account type for the destination account (such as Checking, Savings, Credit Card Broker, etc.). Data fields can also include fields for the originating (or "from") account, including a "From Account" data field, a "From Account Routing Number" data field, and a "From Account Type" data field. Data fields can also include: an "amount" data field that allows systems to record the amount of money being transacted; a "Scheduled On" data field that allows systems to record a date that the scheduled transaction was entered; a "Scheduled for" data field that allows systems to record a future day when a transaction should be processed; a "Submitted by" data field that allows systems to record a submitting party for the transaction (for example, Signatory, Primary, and Secondary parties); a "Requested by" data field that allows systems to record a requesting party for the transaction; and an "originated by" data field that allows systems to record an originating party for the transaction (for example, "Primary", "Signatory on behalf of the primary," etc.). In addition, data fields could include a "Memo field" data field that allows systems to record any information in the memo field of a funds transfer or bill pay transaction.

Data fields may also include source system information, such as a "Source System Confirmation ID" data field, a "Source System Generated ID" data field, and a "Source" data field. The ID fields may be populated with numbers, while the "source" data field may indicate the name of a financial partner or other company participating in the transaction. Data fields may also include a "Type" data field that allows systems to record event types and a "Channel" data field that allows systems to record the channel or platform through which the transaction occurred, such as "web", "mobile," "representative," or "voice."

Other data fields may comprise a "Status" data field that allows systems to record the status of a transaction, for example either "pending" or "processed." Data fields may also allow for the recording of dates and times indicating when a transaction is posted, settled, time until a transaction is live, and time until a transaction is displayed. Specifically, data fields can include a "Posted Date" data field, a "Settlement Date" data field, a "Time to Live" data field, and a "Time to Display" data field.

Artificially intelligent agent 104, also referred to simply as AI agent 104, may also be embedded within container 100. In some cases, AI agent 104 may be stored as executable code within container 100. As described in further detail below, AI agent 104 may be run (that is, executed) on a computing system where container 100 is stored (either temporarily or permanently).

AI agent 104 comprises various modules. These include a data read/write module 110, an autonomous decision module 112, and an external interaction module 114. Data read/write module 110 may comprise provisions for reading data from data storage structure 102. Specifically, data read/write module 110 includes methods, functions, or other provisions for accessing one or more of the data fields 103. Autonomous decision module 112 comprises provisions for analyzing information from data storage structure 102 and making decisions. Exemplary decisions include, but are not limited to: deciding to make autonomous purchases based on financial transaction information and flagging financial transactions as potentially fraudulent. External interaction module 114 may comprise provisions for interacting with various external systems, including for example, merchants, fraud prevention systems, and other financial processing systems.

Figure 2:
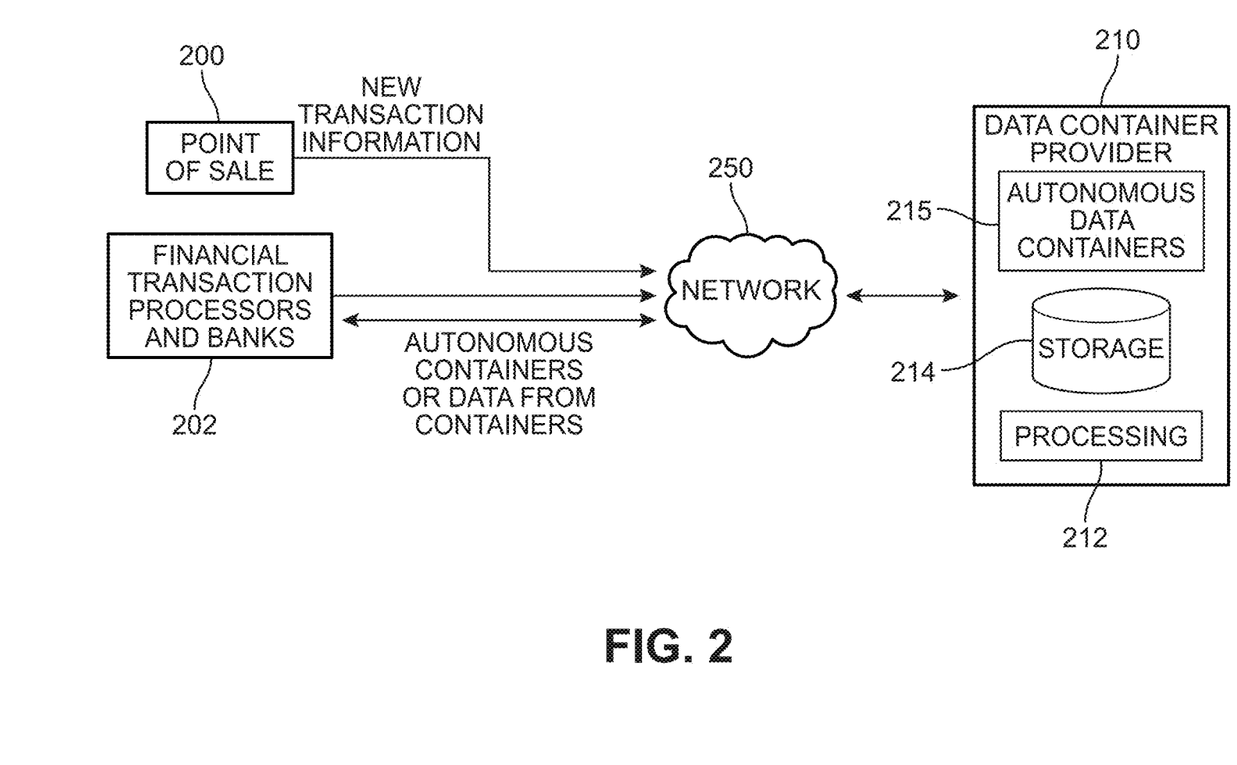
FIG. 2 is a schematic view of an embodiment of an architecture for implementing autonomous data containers.

FIG. 2 is a schematic view of one possible architecture for a financial system that makes use of autonomous data containers, such as autonomous data container 100. In this example, new transaction information may be generated by one or more parties. In some cases, new transaction information can be generated by a point of sale system 200 associated with a merchant or other financial party. For example, if a user (or consumer) purchases a new item at a retailer, the point of sale system associated with the retailer may generate new transaction information associated with the purchase. Additionally, new transaction information could be generated by a bank or other kind of financial transaction processor 202. As used herein, the term "financial transaction processor" refers to any business, system, or service that is involved in processing a financial transaction. A financial transaction processor may also be referred to as a system of record. For example, if a user makes a bank to bank transfer, one or both banks party to the financial transaction may generate a set of associated financial transaction information. Other exemplary financial transaction processors include credit card services, bank to bank transfer systems, web bill pay systems, as well as other kinds of entities that process financial transactions and generate financial transaction information.

The new financial transaction information may be received by a data container provider 210. As used herein, the term "data container provider" refers to a provider that generates autonomous data containers 215 from new transaction information and/or hosts data containers. Such providers may also store autonomous data containers and/or execute code stored in the autonomous data containers. To this end, data container provider 210 may include one or more processing systems 212 and one or more storage systems 214. Processing systems 212 may comprise any kind of computing systems, including servers with processors and memory. Storage system 214 could comprise any suitable kind of data storage, including, for example, a database.

Because various financial transaction processors often need access to financial transaction information in order to process the transaction, processors 202 may retrieve either the autonomous data containers and/or information from data containers (i.e., raw data) from data container provider 210.

It may be appreciated that information can be exchanged to and from data container provider 210 using any suitable network 250. In one embodiment, network 250 may comprise a wide area network, such as the Internet.

Figure 3:
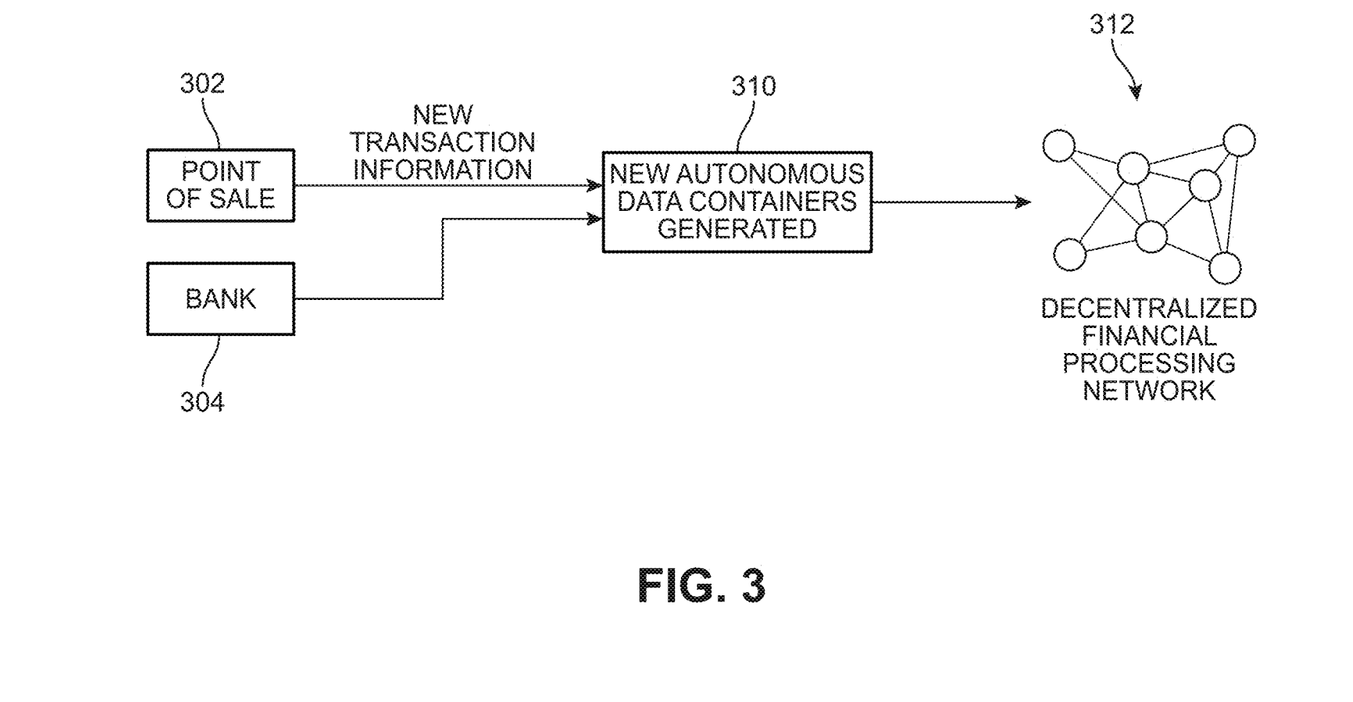
FIG. 3 is a schematic view of another embodiment of an architecture for implementing autonomous data containers.

FIG. 3 is a schematic view of an alternative architecture for a financial system that makes use of autonomous data containers, such as autonomous data container 100. In this architecture, new transaction information generated by one or more parties (such as point of sale system 302 and/or bank 304) is used to create new autonomous data containers 310, which are then distributed within a decentralized financial processing network 312. That is, in this case the autonomous data containers may not be stored and run within a centralized system, such as a data container provider, but may be stored and run on local systems that operate as part of the decentralized network. In the alternative architecture of FIG. 3, the autonomous data containers can be generated by a point of sale system, by a bank, and/or by any financial transaction processors in the processing network.

Figure 4:
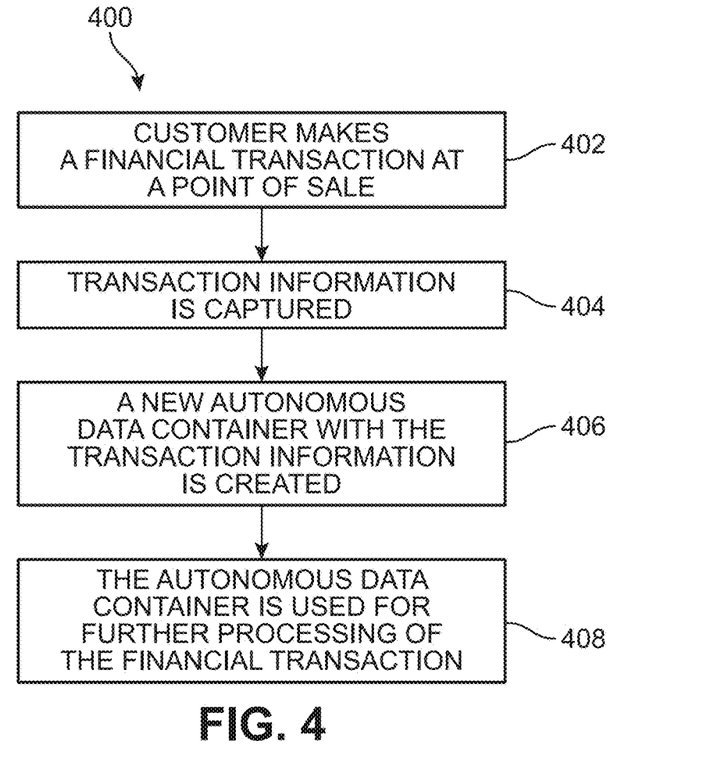
FIG. 4 is a schematic view of a process for creating and using an autonomous data container, according to an embodiment.

FIG. 4 is a schematic view of a process for creating and using an autonomous data container. Starting in step 402, a customer may make a financial transaction at a point of sale. Next, in step 404, the transaction information may be captured. In some cases, the transaction information is captured by a data container provide (such as data container provider 210 of FIG. 2). Next, in step 406, a new autonomous data container with the transaction information can be created. Finally, in step 408, the autonomous data container may be used for further processing financial transactions.

While FIG. 4 describes a process where a new autonomous data container is created after a consumer purchase, it may be appreciated that autonomous data containers can be created to store, and make use of, information from a variety of different kinds of financial transactions. For example, if a bank initiates a bank to bank transfer of money, the financial transaction data generated during that process can be stored in an autonomous data container using a similar process to the one described above and shown in FIG. 4.

Figure 5:
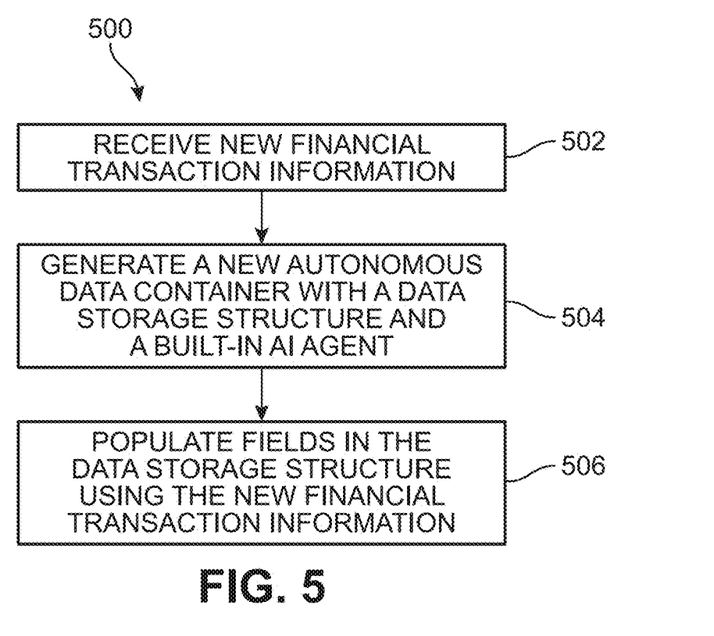
FIG. 5 is a schematic view of a process for creating a new autonomous data container, according to an embodiment.

FIG. 5 is a schematic view of a process for creating new autonomous data containers from financial transaction information. Starting in step 502, a system may receive new financial transaction information. Next, in step 504, the system may generate a new autonomous data container with a data storage structure and a built-in AI agent. In some cases, creating a new autonomous data container may comprise a similar process to initializing a new object or other data structure within a given programming framework. In particular, a template container may be created with empty values for the data storage structure. During this step, executable code for an AI agent may also be copied into the data container. The code corresponding to the AI agent may be accessible through a method or function associated with the data container. This allows the AI agent to be called or run by another system, such as the processing system where the autonomous data container is stored. Finally, in step 506, the system may populate the fields in the data storage structure with the new financial transaction information.

Figure 6:
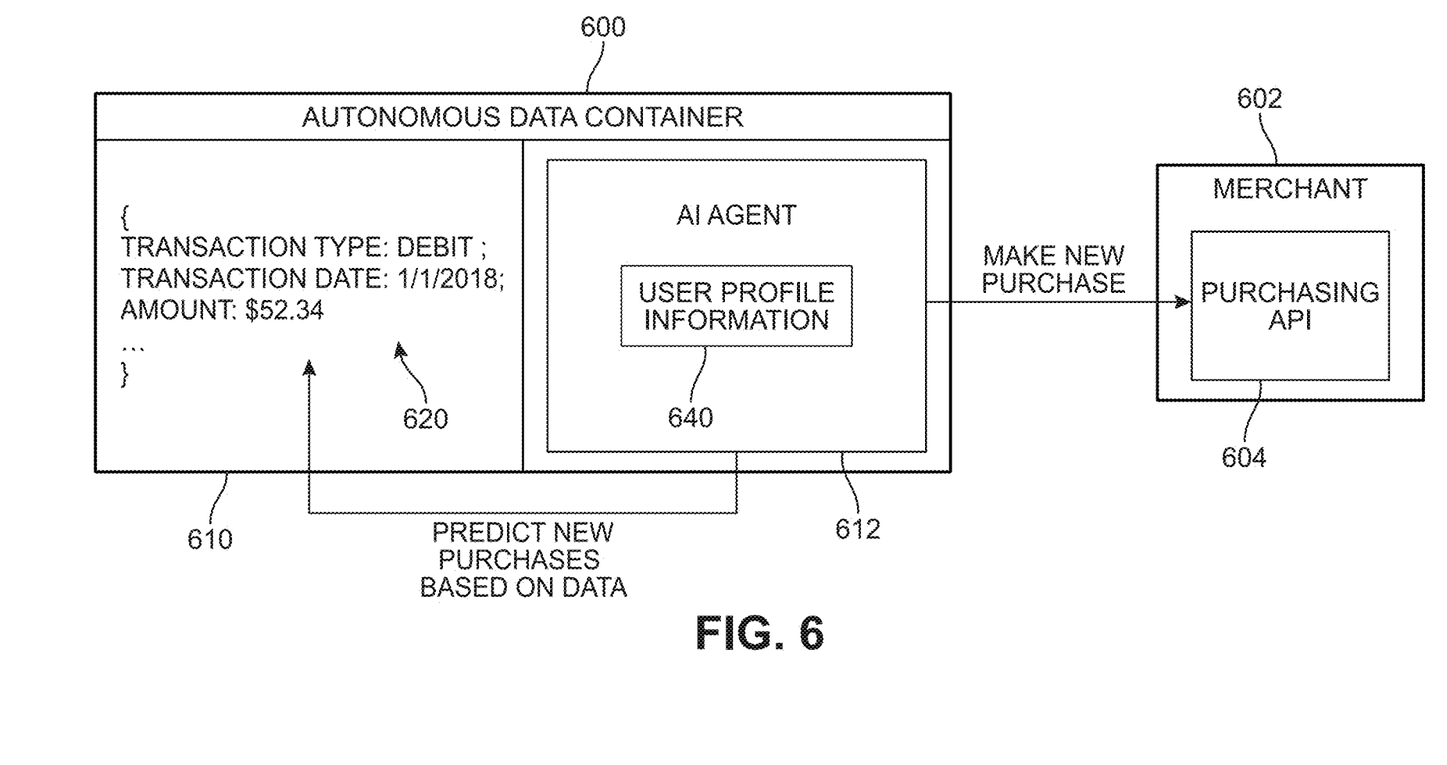
FIG. 6 is a schematic view of an autonomous data container interacting with a merchant, according to an embodiment.
Figure 7:
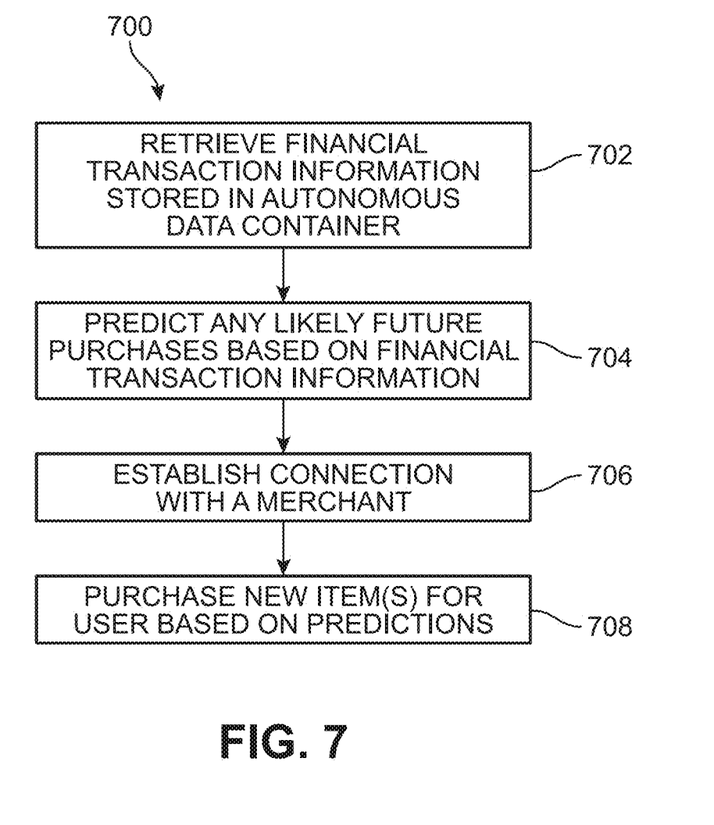
FIG. 7 is a schematic view of a process for purchasing new items on a user's behalf, according to an embodiment.
Figure 8:
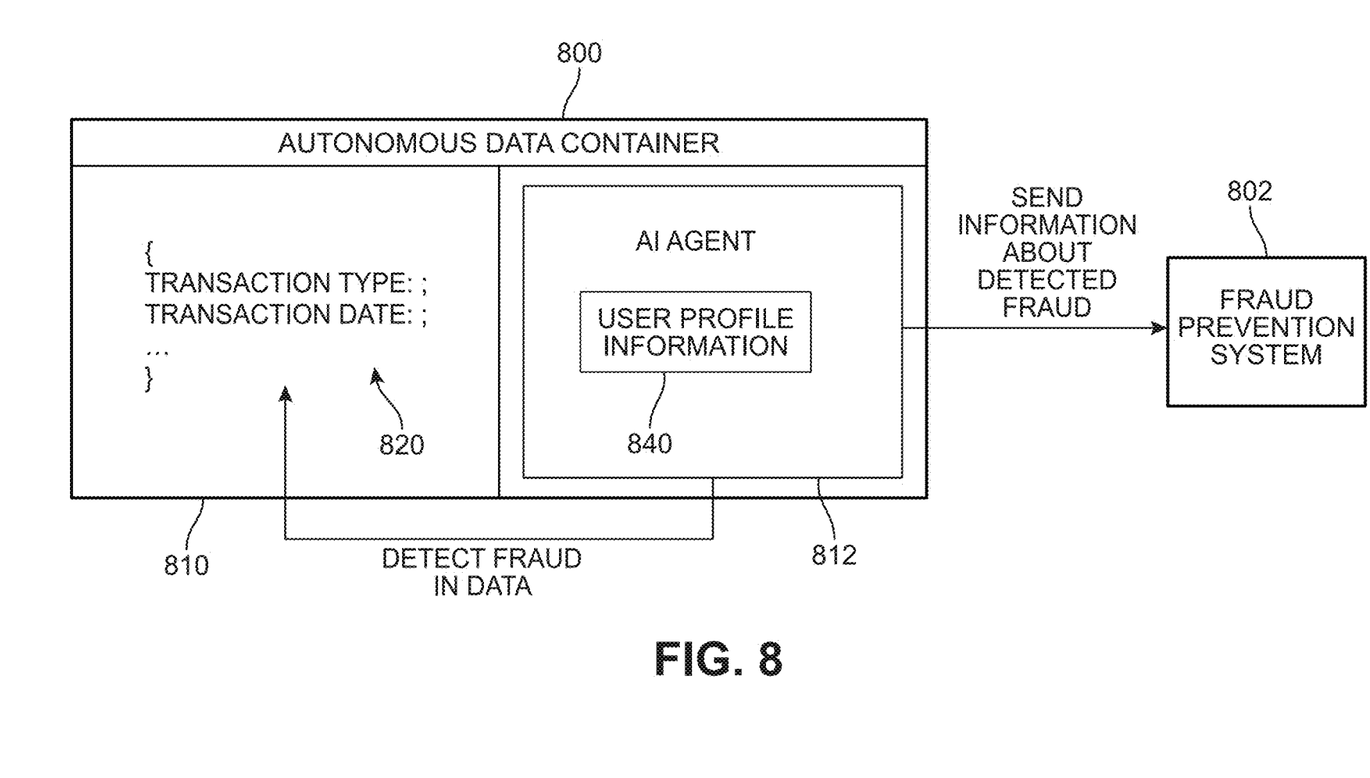
FIG. 8 is a schematic view of an autonomous data container interacting with a fraud prevention system, according to an embodiment.
Figure 9:
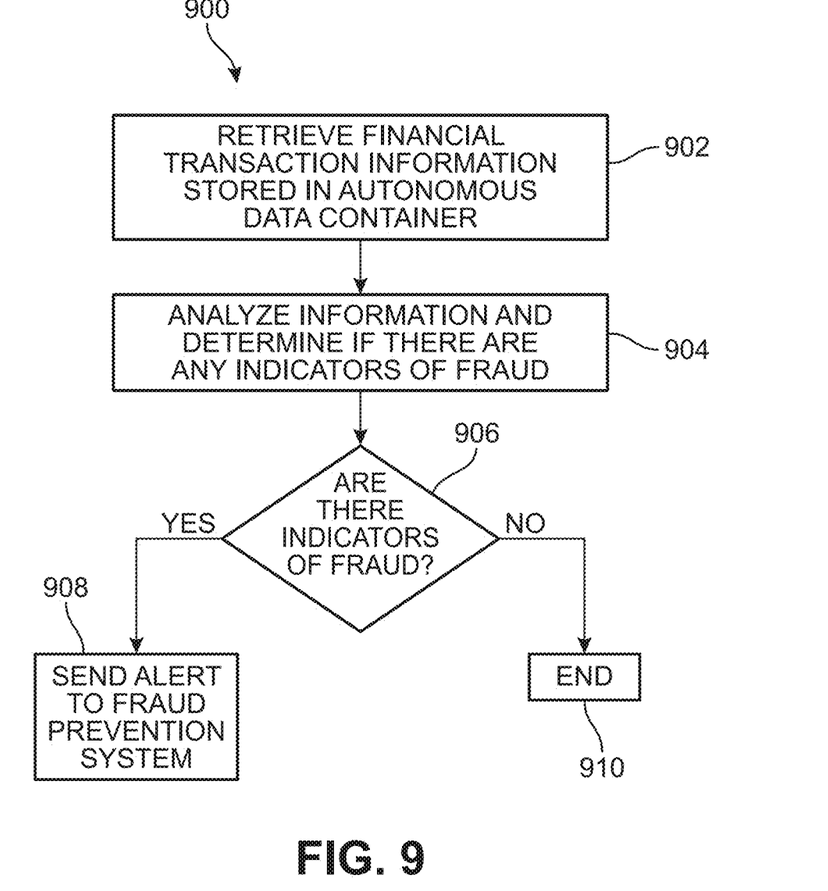
FIG. 9 is a schematic view of a process for generating potential fraud alerts, according to an embodiment.

FIGS. 6-9 are schematic views of exemplary uses of an autonomous data container. Specifically, FIGS. 6-7 are schematic views of using an autonomous data container to automatically make new purchases on a user's behalf, while FIGS. 8-9 are schematic views of using an autonomous data container to automatically detect financial fraud.

FIG. 6 is a schematic view of an autonomous data container 600 and a merchant 602. As shown in FIG. 6, autonomous data container 600 includes a data structure 610 and an AI agent 612. Data structure 610 may be populated with financial transaction information 620 from one or more previous transactions. By analyzing this financial transaction information, AI agent 612 may be able to predict new purchases. That is, AI agent 612 may predict purchases that a user is likely to make in the future based on their purchase history. Based on this prediction, AI agent 612 can establish a connection with a purchasing API 604 of merchant 602 and make a new purchase on the user's behalf.

In some cases, in order to take actions on behalf of a user, an AI agent could include user profile information 640. User profile information could include, for example, identifying information (such as an account number), credit card information, authorization information, address information, as well as any other suitable kinds of information. In addition, in some cases user profile information could include information about a user that may be incorporated into any predictions may be the AI agent. For example, user profile information could include general preferences, information about a user's recent purchasing behavior, or any other suitable information that may help increase the accuracy of the AI agent in making predictions about a user's future behavior.

FIG. 7 is a schematic view of a method corresponding to the configuration shown in FIG. 6. In some cases, one or more of these steps may be performed by an AI agent (for example, AI agent 612) that is stored within the autonomous data container. As previously discussed, the AI agent could be run on a processing system of a data container provider, and/or on another processing system in a decentralized financial network. Alternatively, it is contemplated that users could store their own autonomous data containers locally on their own systems. In such a situation, the AI agent may be run on the user's local system.

Starting in step 702, AI agent 612 may retrieve financial transaction information stored in the autonomous data container. Next, in step 704, AI agent 612 may predict any likely future purchases based on the retrieved financial transaction information in step 702. In step 706, AI agent 612 may establish a connection with a merchant. For example, AI agent 612 may connect to one or more APIs (application programming interfaces) provided by the merchant for making online purchases. Finally, in step 708, AI agent 612 may purchase one or more new items for the user based on the predictions made in step 704.

As one example, suppose a consumer has previously purchased a bottle of 60 vitamins. When the details of the transaction are loaded into an autonomous data container, the AI agent could analyze the purchase information, including that the vitamins are intended to last 60 days, as well as a purchasing date. Based on this, an AI agent could infer that the user may need to purchase another bottle of vitamins to be delivered no later than 60 days from the original purchasing date. The AI agent could then automatically place an order for an additional bottle of vitamins to be delivered to the user.

In another example, suppose a consumer has initiated a recurring bill payment cycle for a utility. If the transaction information associated with this recurring payment are loaded into an autonomous data container, an AI agent associated with the container could continuously monitor the ongoing transaction. If at any point the recurring payment is stopped, the AI agent could determine if this was unintentional, and if so, automatically resume the recurring payment on behalf of the user.

Predicting future purchase and/or payment decisions for a user may be accomplished using any known algorithms from the fields of machine learning and artificial intelligence. Exemplary algorithms that could be used include, but are not limited to: decision trees, neural networks, as well as other suitable algorithms.

FIG. 8 is a schematic view of an autonomous data container 800 and a fraud prevention system 802. Fraud prevention system 802 may be any system or institution tasked with detecting and/or reporting financial fraud. In some cases, fraud prevention system 802 could be part of a bank or credit card provider.

As shown in FIG. 8, autonomous data container 800 includes a data structure 810 and an AI agent 812. Data structure 810 may be populated with financial transaction information 820 from one or more previous transactions. By analyzing this financial transaction information, AI agent 812 may be able to detect fraud, or indicators of possible fraud, in the financial transaction information. Based on this prediction, AI agent 812 can send information about the detected fraud to fraud detection system 802.

In some cases, in order to analyze fraudulent activity and provide reports related to a consumer's account, an AI agent could include user profile information 940. User profile information could include, for example, identifying information (such as an account number), credit card information, authorization information, address information, as well as any other suitable kinds of information. In addition, in some cases user profile information could include information about a user that may useful in monitoring possible fraud. For example, general patterns of user behavior, location, or other factors could be included as part of the user provide information.

FIG. 9 is a schematic view of a method corresponding to the configuration shown in FIG. 8. In some cases, one or more of these steps may be performed by an AI agent (for example, AI agent 812) that is stored within the autonomous data container. As previously discussed, the AI agent could be run on a processing system of a data container provider, and/or on another processing system in a decentralized financial network. Alternatively, it is contemplated that users could store their own autonomous data containers locally on their own systems. In such a situation, the AI agent may be run on the user's local system.

Starting in step 902, AI agent 812 may retrieve financial transaction information stored in the autonomous data container. Next, in step 904, AI agent 812 may analyze the financial transaction information and determine if there are any indicators of potential fraud. In step 906, if there are indicators of fraud, AI agent 812 proceeds to step 908 where it may send an alert or other information to a fraud prevention system. In some embodiments, AI agent 812 could also send alerts directly to a user associated with the financial transaction, as part of step 908. If no fraud indicators are detected, AI agent 812 proceeds from step 906 to step 910, where the process ends.

As one example, suppose a consumer has made a recent purchase, whose transaction data is then stored in an autonomous data container. The AI agent associated with that data container may analyze the transaction data and look for any indicators of fraud. In some cases, the AI agent could retrieve general user patterns, such as where the user tends to buy items and/or when the user tends to make trips to particular stores. If any of the financial transaction information indicates that a purchase was made at store where the user hasn't previously made purchases, or at an unusual time, the AI agent could send a potential fraud alert.

An AI agent may employ any known methods for detecting fraud and/or anomalies in financial transaction data. In some cases, an AI agent could use one or more machine learning models or other suitable anomaly detection algorithms. Exemplary machine learning models can include both supervised and unsupervised learning models. Some embodiments can employ known anomaly detection techniques. These include, but are not limited to: density based techniques (such as k-nearest neighbor, local outlier factor, and isolation forests), outlier detection for high dimensional data, one-class support vector machines, replicator neural networks, autoencoders, long short-term memory neural networks, Bayesian networks, Hidden Markov models, clustering techniques, and suitable ensemble techniques.

It may be the case that it is difficult to make predictions using only the data from a single financial transaction. In some cases, therefore, an AI agent in one autonomous data container may be capable of retrieving data from one or more other autonomous data containers. To prevent duplicate analyses and/or problems of two different AI agents taking inconsistent actions, autonomous data containers can be organized into hierarchies, so that the AI agent on one autonomous data container can analyze data from a set of subordinate data containers.

Figure 10:
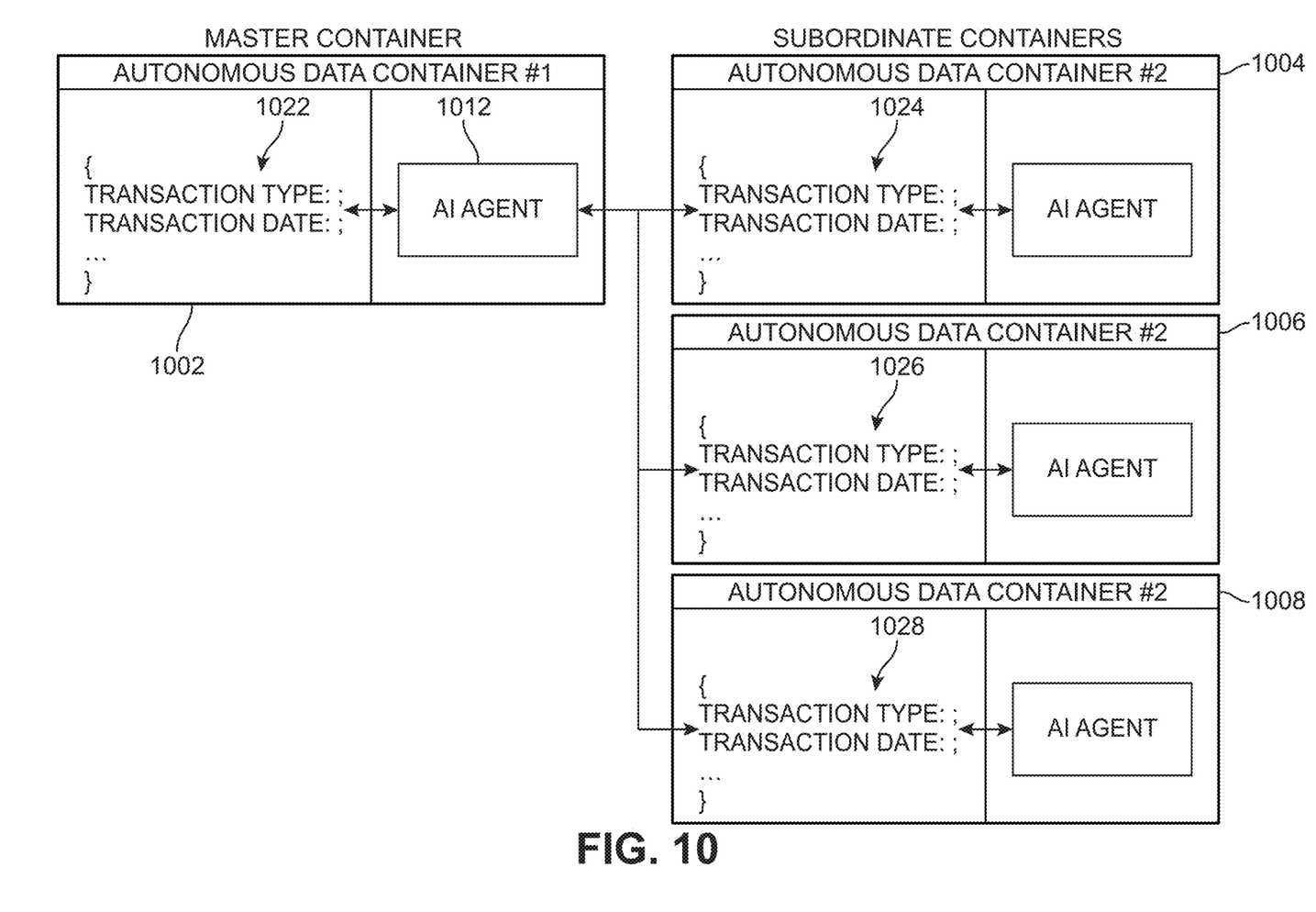
FIG. 10 is a schematic view of a hierarchy of autonomous data containers, according to an embodiment.

FIG. 10 is a schematic view of an exemplary hierarchy of autonomous data containers. Specifically, as seen in FIG. 10, the hierarchy is comprised of a master container (first autonomous data container 1002) and a set of subordinate containers (including second autonomous data container 1004, third autonomous data container 1006, and fourth autonomous data container 1008). With this arrangement, a first AI agent 1012 of first autonomous data container 1002 (the master container) can access the information stored in the data structures of the subordinate containers as well as the data structure in its own container. Specifically, first AI agent 1012 can access first data structure 1022 within first autonomous data container 1002, as well as second data structure 1024 within second autonomous data container 1004, third data structure 1026 within third autonomous data container 1006, and fourth data structure 1028 within fourth autonomous data container 1008. This allows first AI agent 1012 to analyze multiple financial transactions simultaneously in order to make purchasing predictions or to detect possible fraudulent activity.

Figure 11:
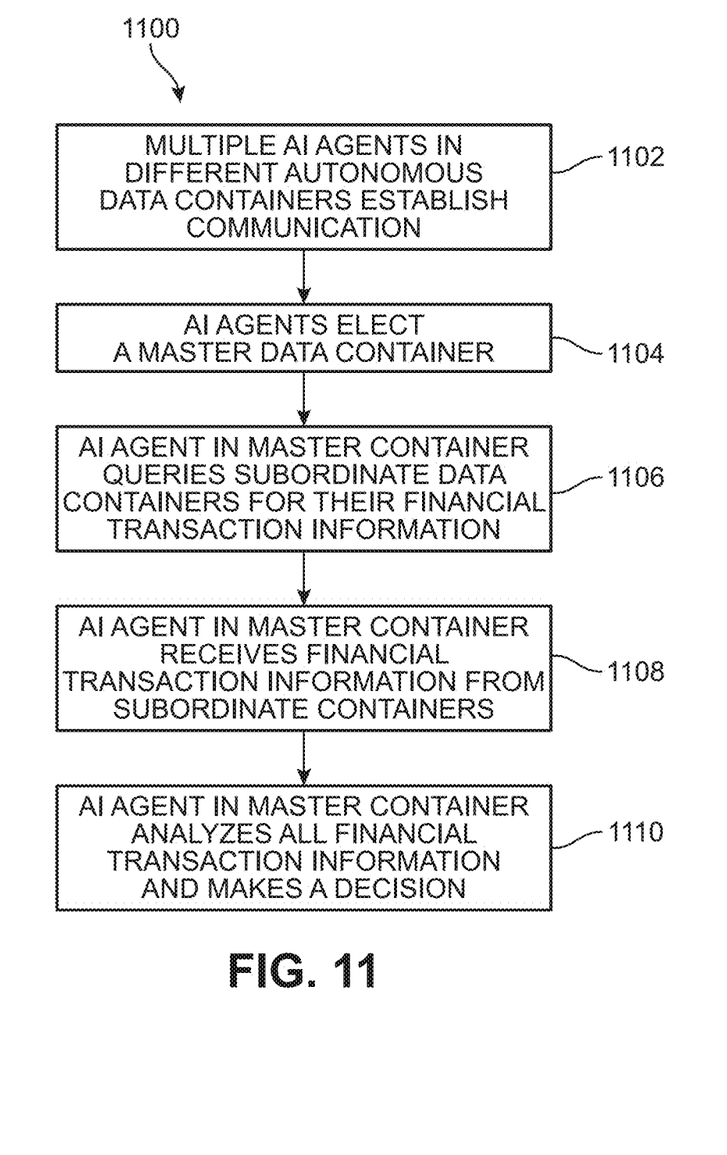
FIG. 11 is a schematic view of a process for making decisions in a hierarchy of autonomous data containers.

FIG. 11 is a schematic view of a process for establishing a hierarchy of autonomous data containers and making predictive decisions about financial transaction data associated with those data containers. Starting in step 1102, multiple AI agents associated with distinct autonomous data containers may establish communication. In some cases, the AI agents may be running on a common local network (or even the same computing system) and could communicate over the local network. In other cases, the AI agents may communicate over wide area networks, such as the Internet.

In step 1104, the AI agents may elect a master data container. In some cases, this election process could be similar to the election process used to promote messaging brokers in a group to a master broker that communicates with slave brokers. Such a process ensures that actions are taken primarily by one node in a group of nodes. In other cases, other suitable methods of selecting a master data container among multiple data containers could be used.

In step 1106, the AI agent associated with the master data container may query the subordinate data containers for their financial transaction information. That is, the AI agent on the master data container requests the financial transaction information from all the remaining autonomous data containers in the group. In step 1108, the AI agent in the master container receives financial transaction information from the other containers.

In step 1110, the AI agent in the master container analyzes all financial transaction information (including information from its own container) and makes one or more decisions. These decisions can include purchasing decisions, fraud alert decisions or any other suitable decisions.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for creating an autonomous data container, the method comprising:
   using computing systems at financial transaction processors to generate financial transaction information from parties conducting financial transactions on the computing systems of the financial transaction processor;
   using the computing system at each the financial transaction processors to generate a separate local autonomous data container on each computing system of each financial transaction processor by creating on each computing system of each financial transaction processor a template container with empty values for a data storage structure on the computing system of the financial transaction processor, copying executable code into the data container on each computing system of each financial transaction processor that when executed by each computing system of the financial transaction processor runs a separate artificially intelligent agent in each autonomous data container that can access the data storage structure in all autonomous data containers on all computing systems of the financial transaction processors, and populating one or more fields in the data storage structure on each computing system of each financial transaction processor using the financial transaction information generated on the computing system of each financial transaction processor, wherein one given artificially intelligent agent in one given autonomous data container can access and analyze transaction information from a set of subordinate autonomous data containers; and using the artificially intelligent agents in the autonomous data containers to elect the one given artificially intelligent agent.

2. The method according to claim 1, wherein the data storage structure is an object.

3. The method of claim 1, wherein the computing systems at the financial transaction processors comprise point of sale systems.

4. The method of claim 1, wherein the computing systems at the financial transaction processors comprise computing systems at banks.

5. The method of claim 1, wherein the method further comprises running the autonomous data containers on each computing system of each financial transaction processor as a decentralized network.

6. The method of claim 1, wherein each artificially intelligent agent comprises a data read/write module, an autonomous decision module, and an external interaction module.

7. The method of claim 1, wherein each financial transaction processor comprises a credit card service, a bank to bank transfer system, or a web bill pay system.

\* \* \* \* \*